US006973666B1

(12) United States Patent
Jacobs et al.

(10) Patent No.: US 6,973,666 B1
(45) Date of Patent: Dec. 6, 2005

(54) METHOD OF MOVING VIDEO DATA THRU A VIDEO-ON-DEMAND SYSTEM WHICH AVOIDS PAGING BY AN OPERATING SYSTEM

(75) Inventors: Robert Louis Jacobs, Sandy, UT (US); James Douglas Sweeney, Salt Lake City, UT (US); Craig William Sorensen, Sandy, UT (US); Mary Elizabeth Deyo, Redmond, WA (US); Richard Lee Gregersen, Salt Lake City, UT (US)

(73) Assignee: Unisys Corporation, Blue Bell, PA (US)

( * ) Notice: Subject to any disclaimer, the term of this patent is extended or adjusted under 35 U.S.C. 154(b) by 950 days.

(21) Appl. No.: 09/796,816

(22) Filed: Feb. 28, 2001

(51) Int. Cl.[7] .................. H04N 7/173; G06F 15/16; G06F 13/00
(52) U.S. Cl. .............. 725/87; 725/91; 725/92; 725/101; 711/152; 711/163; 709/250
(58) Field of Search .................. 725/87, 91–93, 725/114–116, 134, 144, 145–146; 386/45–46, 386/94–95, 125–126; 709/203, 245, 250; 711/163, 152; 370/463; 719/321–327

(56) References Cited

U.S. PATENT DOCUMENTS

| | | | |
|---|---|---|---|
| 5,586,264 A * | 12/1996 | Belknap et al. ........... 725/115 |
| 5,719,983 A * | 2/1998 | Henderson et al. ........... 386/70 |
| 5,737,634 A * | 4/1998 | Hamano et al. ........... 710/27 |
| 5,870,553 A * | 2/1999 | Shaw et al. ........... 709/219 |
| 5,887,187 A * | 3/1999 | Rostoker et al. ........... 712/29 |
| 5,897,658 A * | 4/1999 | Eskesen et al. ........... 711/152 |
| 5,905,847 A * | 5/1999 | Kobayashi et al. ........... 386/113 |
| 5,915,094 A * | 6/1999 | Kouloheris et al. ........... 709/219 |
| 5,920,702 A * | 7/1999 | Bleidt et al. ........... 709/231 |
| 5,928,327 A * | 7/1999 | Wang et al. ........... 725/88 |
| 6,101,499 A * | 8/2000 | Ford et al. ........... 707/10 |
| 6,134,586 A * | 10/2000 | Walker ........... 725/87 |
| 6,201,536 B1 * | 3/2001 | Hendricks et al. ........... 345/716 |
| 6,208,804 B1 * | 3/2001 | Ottesen et al. ........... 386/125 |
| 6,701,360 B1 * | 3/2004 | Diesing et al. ........... 709/223 |
| 6,792,047 B1 * | 9/2004 | Bixby et al. ........... 375/240.26 |
| 2002/0154645 A1 * | 10/2002 | Hu et al. ........... 370/401 |
| 2003/0149988 A1 * | 8/2003 | Ellis et al. ........... 725/87 |
| 2004/0073947 A1 * | 4/2004 | Gupta ........... 725/134 |

* cited by examiner

Primary Examiner—Christopher Grant
Assistant Examiner—Son P. Huynh
(74) Attorney, Agent, or Firm—Charles J. Fassbender; Mark T. Starr; Lisa A. Rode

(57) ABSTRACT

Video data is moved thru a video-on-demand system by the following steps: a) segregating, from an operating system program, a hidden section of a random-access semiconductor memory which cannot be paged by the operating system program; b) writing video data into the hidden section of the memory at addresses which are selected by a video server application program; c) sending, from the video server application program to a network interface circuit, messages which identify the selected addresses; and d) issuing read commands, from the network interface circuit with the selected addresses as identified in the messages, which read the video data directly from the hidden section of the memory into the network interface circuit for transmission to a network.

14 Claims, 4 Drawing Sheets

METHOD OF MOVING VIDEO DATA THRU A VIDEO-ON-DEMAND SYSTEM WHICH AVOIDS PAGING BY AN OPERATING SYSTEM

BACKGROUND OF THE INVENTION

This invention relates to video-on-demand systems which send multiple streams of video data from a video library to respective sets of viewers. In the prior art, one such system is described in U.S. Pat. No. 5,583,561 which is entitled "Multi-Cast Digital Video Server Using Synchronization Groups".

An overview of the above prior art system is shown in FIG. 1 of patent '561. There, multiple video programs are stored in a video library 10 which is coupled to a video server 12; and, the video server 12 is coupled through a network interface circuit 18 to a plurality of video display devices 22, 24, and 26 on a network 20. To receive a particular video at a particular display device, a request is sent by a viewer via a telephone to the video server.

In response to the viewer's request, the video server 12 retrieves the requested video from the video library 10. Thereafter, the retrieved video is sent as a stream of video data from the video server 12 thru the network interface circuit 18 to the viewer on the network 20 who requested to see it.

One method for passing the stream of video data from the video server 12 thru the network interface circuit 18 is disclosed in detail in the above-referenced patent '561. Also, an alternative method is disclosed in a pending patent application which has Ser. No. 09/318,987 and is entitled "Scaleable Video System Having Shared Control Circuits For Sending Multiple Video Streams To Respective Sets Of Viewers". All of the details in the above patent and patent application are herein incorporated by reference.

In the above patent and patent application, the network interface circuit includes a pair of data buffers thru which the video data passes as it travels to the viewer. More specifically, the video data is sent to the viewer from a single data buffer of the pair, in spaced-apart time slots; and while that is occurring, the other data buffer of the pair is filled with video data from the video server which will be sent next to the viewer.

Suppose now that the video server is comprised of a digital computer with a memory that stores both a paging type of operating system program and a video server application program that runs on the computer under the control of the operating system. In that case, portions of the video server application program, including the video data for the viewer, will be moved from the memory to a disk and vice-versa, due to paging by the operating system program.

Consequently, when the network interface circuit tries to fill one of its data buffers with the video data from the video server application program, that video data might not even be in the memory. Instead, that video data could have been moved from memory and written on a disk by the paging operating system program.

Each time the video data actually is removed from the memory by the operating system program, then the operating system program will subsequently need to read the video data from the disk and restore it back in the memory. However, such removing and restoring of the video data in the memory is a waste of processing time on the computer. Further, each time any restoring is not completed before the video data needs to be sent from a data buffer in the network interface circuit to a viewer, then the viewer will see a gap in the video on his display device!

Accordingly, a primary object of the present invention is to provide a method of moving video data thru a video-on-demand system which avoids the above-described problems.

BRIEF SUMMARY OF THE INVENTION

The present invention, as claimed, covers a method of moving video data thru a particular type of video-on-demand system that includes—1) a digital computer which is coupled to a random access semiconductor memory that stores an operating system program, 2) a disk which is coupled to the digital computer that stores multiple application programs, including a video server program, which are paged into and out of the semiconductor memory by the operating system, and 3) a network interface circuit which intercouples the computer to a viewer network. In accordance with the present invention, video data is moved thru the above video-on-demand system by the following process.

First, a section of the semiconductor memory is segregated from being used by the operating system program. This step creates a "hidden" memory section in which no paging by the operating system occurs.

Thereafter, video data is written into the hidden memory section at addresses which are selected by the video server application program. In one embodiment, the video data is written in blocks, and the video server application program selects a starting address in the hidden memory section for each block. Also, the video server application program generates a hidden memory map which correlates the blocks, in their consecutive order for transmission on the viewer network, to their respective starting addresses in the hidden memory.

Subsequently, the video server application program sends messages to the network interface circuit which identify the starting addresses of the video data blocks in the hidden memory section. Then using those addresses, the video data is read in a stream directly from the hidden memory section by the network interface circuit, stored temporarily in a pair of data buffers, and sent from the data buffers to display devices on the network during spaced-apart time intervals.

With the above process, the video data is always present in the hidden memory section when that memory is needed to fill a data buffer in the network interface circuit. This occurs because the video data is not paged out of the hidden memory section by the operating system. Consequently, no computer processing time is wasted by storing any of the video data on a disk and subsequently retrieving that video data; and, no gaps occur in the video which the viewer sees on his display device.

DETAILED DESCRIPTION

Figure 1:
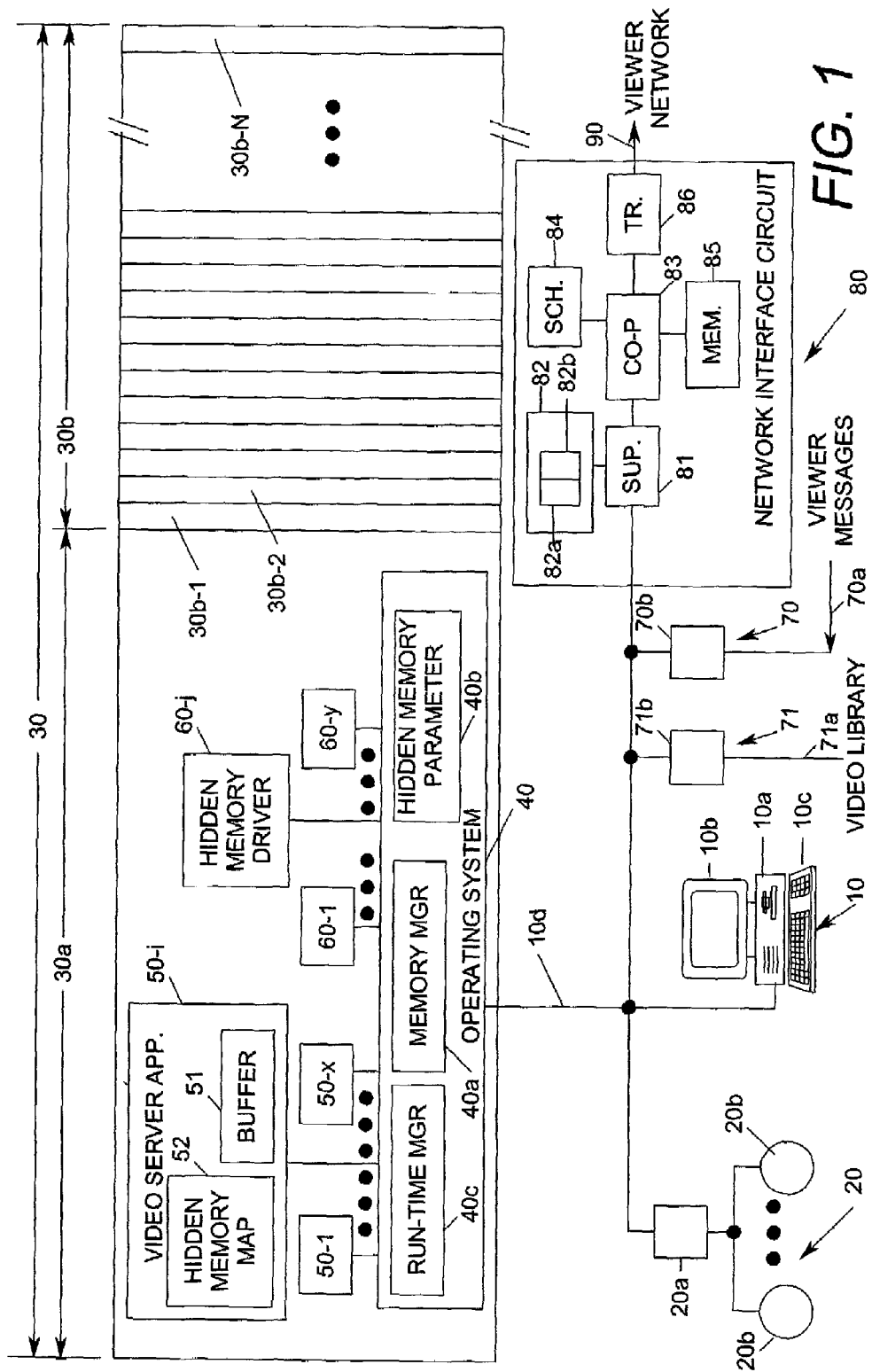
FIG. 1 shows one preferred embodiment of a video-on-demand system, which processes video data in accordance with the present invention.

Referring now to FIG. 1, it shows one preferred embodiment of a video-on-demand system which processes video data in accordance with the present invention. This FIG. 1 system is comprised of modules 10, 20, 30, 40, 50-1 thru 50-*x*, 60-1 thru 60-*y*, 70, 71, 80, and 90 which are inter-coupled to each other as shown.

Module 10 is a digital computer. It includes an instruction processor 10*a*, a visual monitor 10*b*, a keyboard 10*c*, and an I/O bus 10*d*. The instruction processor 10*a* sequentially executes instructions that are in various programs 40, 50-1 thru 50-*x*, and 60-1 thru 60-*y* which will be described in detail later. In one embodiment, the instruction processor 10*a* is the Pentium™ instruction processor from Intel Corp.

Module 20 is a disk storage module. It includes a disk controller 20*a* and a set of disks 20*b*. The disks 20*b* can be magnetic storage-type disks or optical storage-type disks, as desired. The disks 20*b* store all of the programs 40, 50-1 thru 50-*x*, and 60-1 thru 60-*y*. These programs are read from and written back to the disks 20*b*, in response to commands that are sent to the disk controller 20*a* over the I/O bus 10*d*.

Module 30 is a random access semiconductor memory. This memory 30 contains a multitude of storage cells that are selected by memory addresses. To read or write particular store storage cells, commands with accompanying memory addresses are sent to the memory 30 on the I/O bus 10*d*.

One particular feature of the memory 30 is that it is partitioned into two sections 30*a* and 30*b*. Section 30*a* is managed by program 40, which is an operating system program for the computer 10. By comparison, section 30*b* is hidden from the operating system program for the computer 10. Consequently, section 30*b* of the memory 30 cannot be used by the operating system program 40.

Programs 50-1 thru 50-*x* are user application programs. All of these programs run under the control of the operating system program 40. Programs 60-1 thru 60-*y* are device driver programs which perform various I/O operations. These device driver programs are called, as needed, by the user application programs 50-1 thru 50-*x* to send or receive various types of digital data.

Initially, all of the programs 40, 50-1 thru 50-*x*, and 60-1 thru 60-*y* are stored on the disks 20*b*. Then, when the FIG. 1 system is powered-up, the operating system program is automatically read into the memory section 30*a*. Thereafter, the operating system program moves portions of the user application programs 50-1 thru 50-*x*, and portions of the driver programs 60-1 thru 60-*y*, into and out of the memory section 30*a*.

The portions of the application programs 50-1 thru 50-*x* and driver programs 60-1 thru 60-*y* which are moved into the memory section 30*a* are those which currently need to be run on the computer 10. When the memory section 30*a* gets full, the portions of the application programs 50-1 thru 50-*x* and driver programs 50-1 thru 60-*y* which are moved back to the disks 20*b* are those which were run least recently.

To manage the above moving of the application programs 50-1 thru 50-*x* and driver programs 60-1 thru 60-*y*, a subprogram 40*a* is included in the operating system program 40. This moving of the application programs 50-1 thru 50-*x* and driver programs 60-1 thru 60-*y* by the subprogram 40*a* is herein called paging.

Also included in the operating system 40 is a hidden memory parameter 40*b*. This parameter 40*b* indicates the starting address in the memory 30 for the hidden memory section 30*b*. With the operating system subprogram 40*a*, the above paging operations can only occur in the memory 30 at addresses which are less than the starting address as indicated by the parameter 40*b*.

Further included within the operating system program 40 is another subprogram 40*c*. Subprogram 40*c* allocates time slots for running the multiple application programs 50-1 thru 50-*x* and the multiple driver programs 60-1 thru 60-*y* on the digital computer 10. Due to the operation of subprogram 40*c*, the application programs 50-1 thru 50-*x* and driver programs 60-1 thru 60-*y* run on the digital computer 10 in a time-shared manner.

Included within the programs 50-1 thru 50-*x* and 60-1 thru 60-*y* is a video server application program 50-*i* and a hidden memory driver program 60-*j*. These two programs 50-*i* and 60-*j* are of particular importance because they move video data thru the FIG. 1 system in accordance with the present invention.

Module 70 is a communications module which receives various control messages from viewers of the video data. These control messages select particular videos and include VCR-like commands which control the selected video. Examples of the VCR-like commands are START, STOP, FAST-FORWARD, and REVERSE. Each control message is received in module 70 on a communications channel 70*a* by a controller 70*b*; and the controller 70*b* sends the control message on the I/O bus 10*d* to the video server application program 50-*i*.

All of the video data that is selected by the above control messages initially comes from a video library, which is remotely located. To selectively access the video data as it is needed, the video server application program 50-*i* sends request messages on the I/O bus 10*d* to module 71. Module 71 is another communications module which includes a communications link 71*a* to the remote video library, and it includes a communications controller 71*b* which couples the communications link 71*a* to the I/O bus 10*d*.

In response to each request message, the video library sends the requested video data in a predetermined format to the communications controller 71*b* which in turn writes that video data into a data buffer 51 that is in the video server application program 50-*i*. Then, the video data in the buffer 51 is changed as desired, by the video server application program 50-*i*, to another format that is tailored for distribution by module 80 to multiple viewers.

However, the video data in buffer 51 is not sent from that buffer directly to the module 80. Instead, after the video data in the data buffer 51 has been put in the proper format, that video data is moved from the data buffer 51 to the hidden memory section 30*b*. This moving of the video data is performed by the video server application program 50-*i* in conjunction with the hidden memory driver 60-*j*.

To carry out the above task, the video server application program 50-*i* generates a hidden memory map 52. This map 52 divides the hidden memory section 30*b* into a plurality of blocks 30*b*-1 thru 30*b–n*. Video data from the data buffer 51 can be stored in any one of the blocks 30*b*-1 thru 30*b–n*. The hidden memory map 52 correlates the blocks of a particular video, in their consecutive order for transmission to module 80, to the respective starting addresses of the blocks in the hidden memory section 30*b*.

The actual transfer of video data from buffer 51 to one of the blocks 30*b*-1 thru 30*b–n* in the hidden memory 30*b*, is performed by the hidden memory driver program 60-*j*. That driver program 60-*j* is called by the video server application program 50-*i* each time video data needs to be transferred from buffer 51 into the hidden memory 30*b*. With each such call, the video server application program 50-*i* identifies the particular block where the video data is to be stored.

From the hidden memory section 30*b*, the video data is read by module 80 for distribution to multiple viewers. Module 80 is a network interface circuit which includes components 81-86. Component 81 is a supervisor processor which has a memory 82. Component 83 is a co-processor which has a scheduler circuit 84 and a control memory 85. Component 86 is a transmitter that connects the co-processor 83 to a viewer network 90 which is coupled to multiple display devices for the viewers.

Within the memory 82, a pair of data buffers 82*a* and 82*b* is provided for each stream of video data that is to be sent on the network 90 in spaced-apart time slots. Initially, the supervisor processor 81 fills both of the data buffers 82*a* and 82*b* with video data from the hidden memory 30*b*. Thereafter, the co-processor 83 starts sending video data from the data buffer 82*a* to the network 90 in spaced-apart time slots. When all of the data in the data buffer 82*a* has been sent, the co-processor 83 starts sending video data from the data buffer 82*b*; and at the same time, the supervisor processor 81 fills data buffer 82*a* with the video data that will be sent next. This process of sending video data from one data buffer while filling the other data buffer with video data that will be sent next continues over and over until the video server application program 50-*i* sends a command to stop the process to the supervisor processor 81.

To initially fill both of the data buffers 82*a* and 82*b* with video data, the video server application program 50-*i* must first receive a control message, from a viewer via the communication module 70, such as a command to START a particular movie. In response, the video server application program 50-*i* examines the hidden memory map 52 to thereby obtain the appropriate beginning address of the video data in the hidden memory 30*b*, and it sends that beginning address to the supervisor processor 81. Thereafter, the supervisor processor 81 uses the beginning address that it was sent to fill the data buffers 82*a* and 82*b* with the video data from the hidden memory.

Preferably, the total number of bytes in each block of the hidden memory 30*b* is an integer "n" times the total number of bytes in each of the data buffers 82*a* and 82*b*. One practical range for the integer "n" is from ten to one-thousand. For any given integer "n", the supervisor processor 81 will fill the data buffers 82*a* and 82*b* a total of "n" times before it needs the beginning address of the next block of video data in the hidden memory section 30*b*.

When all of the video data in one block of the hidden memory 30*b* has been sent to the data buffers 82*a* and 82*b*, the supervisor processor 81 sends a message on the I/O bus 10*d* to the video server application program 50-*i*. This message notifies the video server application program 50-*i* that the above event occurred. In response, the video server application program 50-*i* examines the hidden memory map 52 and thereby determines which block in the hidden memory section 30*b* stores the video data that should be sent next. Then, the beginning address of that next block is sent by the video server application program 50-*i* to the supervisor processor 81. Thereafter, the supervisor processor 81 uses the address that it received to transfer the next block of video data directly from the hidden memory section 30*b* into the data buffers 82*a* and 82*b* as was described above.

From the data buffers 82*a* and 82*b*, video data is transferred by the co-processor 83 to selected viewers on the network 90 in a time-shared fashion as follows. For each particular viewer, the scheduler circuit 84 allocates certain time-slots on the network 90. Then, when a time-slot for a particular viewer occurs, the co-processor 83 reads a predetermined number of bytes of video data from a data buffer in the memory 82. Then, that video data is sent to the viewer on the network 90.

All of the above-described operations of the supervisor processor 81 and the co-processor 83 occur independently with respect to the actions of the operating system program 40. Thus, for example, the operating system 40 will perform paging on the memory section 30*a* while the supervisor processor 81 asynchronously reads video data from the hidden memory section 30*b*.

Now, for comparison purposes, suppose that the memory section 30*b* was not hidden from the operating system program 40. In that case, the memory manager program 40*a* within the operating system program 40 would move portions of the programs 50-1 thru 50-*x* and 60-1 thru 60-*y* into and out of the memory section 30*b*. This would occur due to paging, just like that which occurs in the memory section 30*a*.

Consequently, when the supervisor processor 81 sends a message to the video server application program 50-*i* which indicates that the current block of video data has been completely sent to the viewer network 90, the next block of video data might not even be in the memory section 30*b*. Instead, that next block of video data could have been removed from the memory section 30*b*, and written into a paging file on one of the disks 20*b*, by the operating system program 40*a*.

If the next block of video data actually was removed from the memory section 30*b* and written into a paging file, then the operating system program 40 would need to retrieve that video data from the paging file on the disks 20*b* and write that video data into the memory 30*b*. But during this write, the video data could get stored in different locations in the memory 30*b* compared to where it was originally stored. Consequently, the video server application program 50-*i* would need to revise the memory map 52.

Each of the above operations is a waste of processing time on the instruction processor 10*a*. Further, if the above operations are not completed before the video data is needed for the time-slots that are assigned by the scheduler 84, then the viewers of that video data on the network 90 will see a gap in the video which they are viewing! But, with the present invention, both of these problems are completely avoided.

Figure 2:
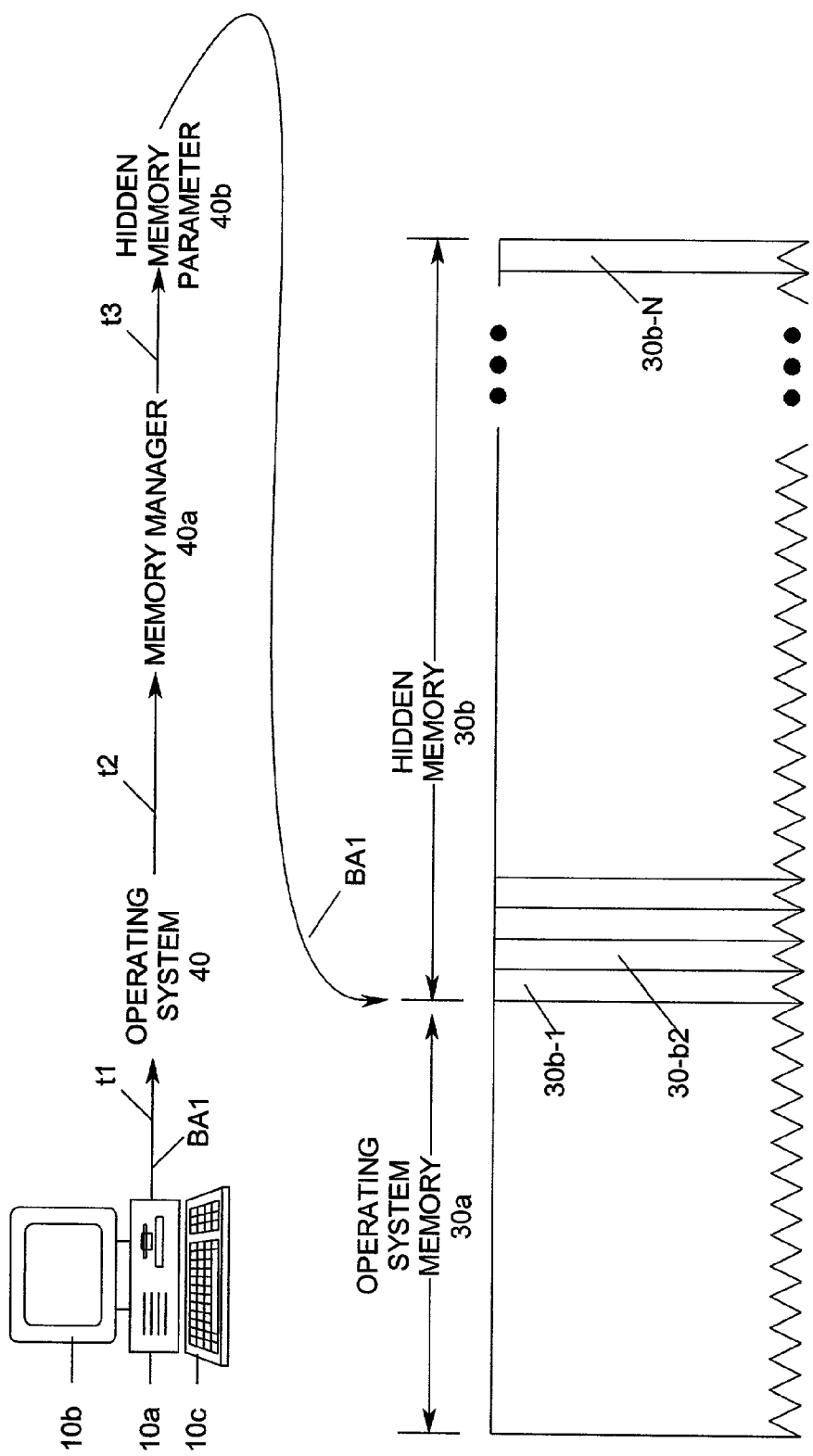
FIG. 2 shows a sequence of steps by which a section of a memory in the FIG. 1 system is hidden and segregated from use by an operating system program that also is in the FIG. 1 system.

Turning now to FIG. 2, additional details will be described on the process for segregating the hidden memory section 30*b* from the operating system program 40. This process begins with an operator of the computer 10 who uses the keyboard 10*c* to manually type in the beginning address of the first block 30*b*-1 in the hidden memory section 30*b*. This beginning address, which is indicated in FIG. 2 as BA1, is sent at time t1 thru the instruction processor 10*a* to the operating system 40.

When the beginning address BA1 is received by the operating system 40, that address is passed at time t2 to the memory manager 40*a*. Then at time t3, the memory manager 40*a* stores the beginning address BA1 as the hidden memory parameter 40*b*. Thereafter, the memory manager 40*a* limits its paging operations to storage cells in the memory 30 which have addresses that are less than the beginning address BA1.

Next, with reference to FIG. 3, additional details will be described on the process by which the video server application program 50-*i* writes video data into the hidden memory section 30*b*. Initially, when video server application program 50-*i* first starts to run, that program reads the beginning address BA1 which was stored as the hidden memory parameter 40*b*. This occurs in FIG. 3 at time t11. Then, the video server application program 50-*i* determines the beginning address for each of the blocks 30*b*-1 thru 30*b*–*n* in the hidden memory 30*b*, starting with the address BA1.

Figure 3:
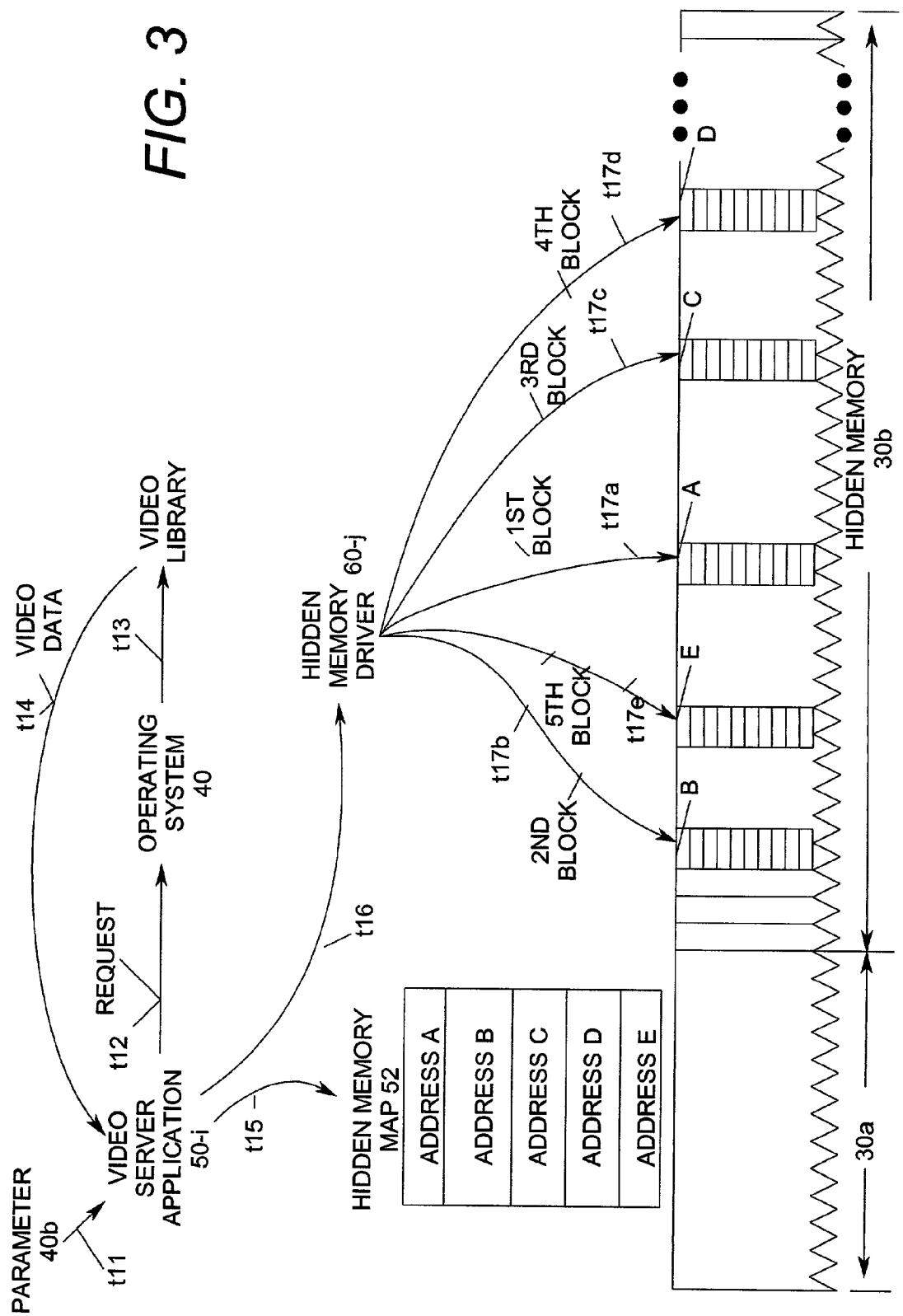
FIG. 3 shows a sequence of steps by which a video server application program, within the FIG. 1 system, writes video data into the hidden memory section of FIG. 2.

Thereafter, at time t12 in FIG. 3, the video server application program 50-*i* sends a request to the operating system program 40 to read a selectable portion of a particular video from the remote video library. In FIG. 3, the selected portion is five blocks, as an example. In response, the operating system program 40 calls the particular one of the device driver programs 60-1 thru 60-*y* which interacts with the communications module 71. That device driver program then passes the request for the five blocks of video data thru the communications module 71 to the remote video library. This occurs in FIG. 3 at time t13.

In response, at time t14 in FIG. 3, the video library sends the requested five blocks of video data to buffer 51 in the video server application program 50-*i*. To travel to that buffer, the video data passes thru the communications module 71 and its device driver program, which was called by the operating system program as described above.

Next, the video server application program 50-*i* puts the five blocks of video data in the buffer 51 into a format which is tailored for use by the supervisor processor 81 and co-processor 83. Then, the video data in buffer 51 is ready to be moved into the hidden memory 30*b*.

To keep track of the consecutive order of the five blocks of video data, the video server application program 50-*i* generates a portion of the hidden memory map 52 as shown in FIG. 3. This occurs at time t15. As shown in that map, the first block of video data in buffer 51 will be stored in the hidden memory section beginning at address "A"; the second block of video data in buffer 51 will be stored in the hidden memory section beginning at address "B", etc.

Within the hidden memory section 30*b*, the five starting addresses of "A", "B", "C", "D", and "E" can be in any order. This is illustrated in FIG. 3. There, for example, address "B" is less than address "A"; and address "C" is greater than address "A".

To initiate the transfer of the five blocks of video data from buffer 51 into the hidden memory 30*b*, the video server application program 50-*i* calls the hidden memory driver program 60-*j*. This occurs at time t16. In that call, the video server application program 50-*i* tells the hidden memory driver program 60-*j* that the total number of blocks to transfer is five and their respective starting addresses are "A", "B", "C", "D", and "E". Thereafter, at times t17*a* thru t17*e*, the hidden memory driver 60-*j* performs the actual transfer of the video data from buffer 51 into the hidden memory 30*b*.

As one modification to the above-described sequence of FIG. 3, the total number of blocks of video data which is transferred can be any number, rather than just the five blocks that are shown. Also, as another modification, one block of video data can be written by the video server application program 50-*i* into the hidden memory 30*b*; while concurrently, another block of video data is read by the video server application program 50-*i* from the remote video library. With this modification, the first block would be written into the hidden memory 30*b* while the second block is read from the video library; then the second block would get written into the hidden memory 30*b* while the third block is read from the video library; etc.

Next, with reference to FIG. 4, additional details will be described on how video data is transferred from the hidden memory section 30*b* thru the network interface circuit 80 to selected viewers on the network 90. At the start of such a transfer for any one particular video, a pair of the data buffers 82*a* and 82*b* in the memory 82 must be filled. This occurs as follows.

Figure 4:
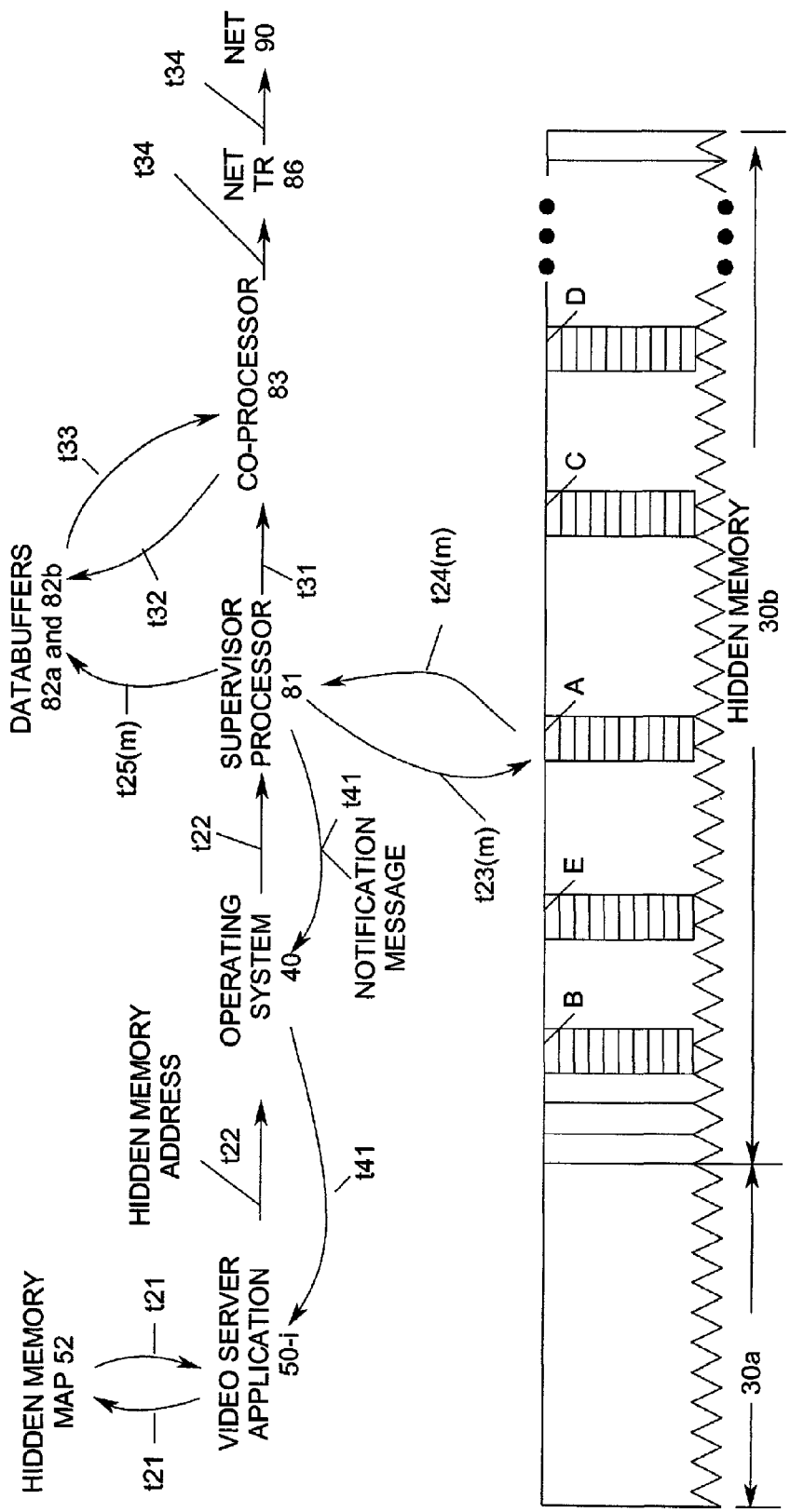
FIG. 4 shows a sequence of steps, by which a network interface circuit, in the FIG. 1 system, reads video data from the hidden memory section of FIG. 2 and sends that video data to selected viewers.

At time t21 in FIG. 4, the video server application program 50-*i* examines the hidden memory map 52 which it previously generated for the selected video. By that examination, the video server application program 50-*i* determines that the initial starting address for the selected video is an address "A". Then at time t22, the video server application program 50-*i* sends the address "A" thru the operating system program 40 to the supervisor processor 81.

Thereafter, the supervisor processor 81 fills the data buffers 82*a* and 82*b* with video data from the hidden memory block which starts at the address "A". Suppose, for example, that—1) each block contains four megabytes of video data, 2) that one-thousand bytes can be read on the I/O bus 10*d* with a single read command, and 3) that the data buffers 82*a* and 82*b* each hold fifty kilobytes. In that case, to fill the data buffer 82*a*, the supervisor processor 81 sends fifty read commands to the memory 30*b* with the memory address "A" being incremented by one-thousand for each successive read command.

In FIG. 4, the above read commands are sent by the supervisor processor 81 at times t23(*m*), and the corresponding video data bytes are received by the supervisor processor 81 at times t24(*m*). Here "m" is an integer that varies from "1" to "50". All of the video data bytes that are received are stored by the supervisor processor 81 in the data buffer 82*a* at times t25(*m*). Then, to fill the other data buffer 82*b*, the above steps at times t23(*m*), t24(*m*), and t25(*m*), are repeated.

Following the above steps, the supervisor processor 81 sends a command to the co-processor 83 to start sending the video data from the pair of data buffers 82*a* and 82*b* to viewers on the network 90. This occurs in FIG. 4 at time t31. In response, the co-processor 83 waits for time slots to occur from the scheduler circuit 84 for the video's viewers. Each time such a time-slot occurs, the co-processor 83 sends a read command to one of the data buffers 82*a* or 82*b*, receives a predetermined number of bytes of video data in response, and transfers that received video data thru the network transmitter circuit 86 to one viewer. These steps respectively occur in FIG. 4 at times t32, t33 and t34.

When all of the video data in one of the data buffers 82*a* or 82*b* has been completely sent on the network 90, the co-processor 83 notifies the supervisor processor 81. Then, in response to that notification, the supervisor processor 81 fills the data buffer that was sent by repeating the steps that were described above as occurring at times t23(*m*), t24(*m*) and t25(*m*).

When all of the video data in one block has been transferred from the hidden memory 30*b* to the data buffers 82*a* and 82*b*, then the supervisor processor 81 notifies the video server application program 50-*i*. This notification occurs by a message which is sent at time t41. In response, the video server application program 50-*i* examines the hidden memory map 52 to thereby determine the starting address of the next block of video data and it sends that address to the supervisor processor 81. That address is then used by the supervisor processor 81 to read video data from the hidden memory section 30b and stores it in the data buffers 82a or 82b by repeating the steps of times t23(m), t24(m), and t25(m).

One preferred embodiment of a video-on-demand system which processes video data in accordance with the present invention has now been described in detail. In addition, however, various changes and notifications can be made to these details without departing from the scope of the invention which is claimed.

For example, the video data which is obtained from the video library and is passed thru the FIG. 1 system by the process of FIGS. 3 and 4, preferably is the digital representation of a selectable movie which includes sound, picture and control data. However, as one modification, the video data can be the digital representation of pictures without sound, or the digital representation of sound without pictures, or the digital representation of any other thing.

Further, with the FIG. 1 system, a selected video can be read from the video library and written into the hidden memory 30b, either in its entirety or in parts. For example, suppose that a single viewer on the network 90 requests a particular movie #1, while a large number of other viewers request a different movie #2. In that case, the video server application program 50-i can elect to store movie #2 in its entirety in the hidden memory 30b and only store a few blocks of movie #1 in the hidden memory 30b. Then, each time one entire block of move #1 has been sent to its viewer, that block can be replaced with the next block by the video server application program 50-i. All of this is done by the previously described process steps of FIG. 3. By storing only a few blocks of a movie in the hidden memory 30b, the total storage capacity that is required for the hidden memory 30b is reduced.

Also with the FIG. 1 system, the beginning address BA1 of the hidden memory 30b can be established automatically, rather than manually as shown in FIG. 2. For example, when the FIG. 1 system is initially powered on, the operating system 40 can automatically read an initialization file that stores the beginning address BA1 which is preset at a factory.

Further with the FIG. 1 system, several copies of the network interface circuit 80 can be coupled in parallel to the I/O bus 10. With this modification, each network interface circuit 80 will read video data from the hidden memory 30b and pass that video data to a respective viewer network. Each time another network interface circuit 80 is added to the FIG. 1 system, very little additional processing will be required from the computer 10; and, this is because the video server application program 50-i only sends the beginning address of blocks of video data (not the video data itself) to the network interface circuits.

Further with the FIG. 1 system, the supervisor processor 81 can store the beginning address of the block of video data in hidden memory 30b that is currently being sent to the viewer network 90; and concurrently, it can also store the beginning address of the block of video data in hidden memory 30b that will be sent next. Then, when the co-processor 83 finishes sending the current block of video data, the supervisor processor 81 will already have the beginning address of the next block. This enables the supervisor processor 81 to immediately fill the data buffer 82a or 82b which just emptied with video data from the next block. Thereafter, the supervisor processor 81 will notify the video server application program 50-i; and, in response, it will send to the supervisor processor 81, the address of the hidden memory block which follows the next block.

In view of the above, it is to be understood that the present invention is not limited to just the illustrated preferred system and its illustrated preferred method of operation, but is defined by the appended claims.

What is claimed is:

1. A method of moving video data thru a video-on-demand system to a viewer network, where said system includes—1) a digital computer which is coupled to a random access memory that stores an operating system program, 2) a disk which is coupled to said digital computer that stores a video server program as well as other programs which are paged into and out of said memory by said operating system program, and 3) a network interface circuit which intercouples both said memory and said computer to said viewer network; said method including the steps of:

segregating, from use by said operating system program, a hidden section of said memory;

writing video data into said hidden section of said memory, at addresses which are selected by said video server program;

sending, from said video server program to said network interface circuit, messages which identify said selected addresses;

issuing read commands to said memory, directly from said network interface circuit and independent of any program in said hidden section of said memory, which request said video data at said selected addresses; and, receiving said video data in said network interface circuit directly from said hidden section of said memory in response to said read commands and independent of any program in said hidden section of said memory.

2. A method according to claim 1 wherein said segregating step includes the substep of inputting control information, into both said operating system program and said video server application program, which selects an address boundary for said hidden section of said memory.

3. A method according to claim 2 wherein said control information is input manually, into said operating system program and said video server application program, through an input device that is coupled to said computer.

4. A method according to claim 2 wherein said control information is input such that said hidden section of said memory has sequential addresses that range from a selectable starting address to a predetermined upper limit.

5. A method according to claim 1 wherein said writing step includes a first substep by which said video data is transferred in one format into a buffer in said video server application program, and a second substep by which said video data is selectively modified to a different format before being written into said hidden section of said memory.

6. A method according to claim 1 wherein said writing step includes the substeps of dividing said video data into several blocks which each have the same number of words, and writing each block into said hidden section of said memory at a respective beginning address which is selected by said video server program.

7. A method according to claim 6 wherein said writing step further includes the substep of generating a map which correlates said several blocks of video data, in their consecutive order, to their respective beginning address.

8. A method according to claim 6 wherein said video data comprises several separate movies, and said writing step stores all of the blocks for all of said movies in said hidden section of said memory at the same time.

9. A method according to claim 6 wherein said video data comprises several separate movies, and said writing step stores only a subset of the blocks for each movie in said hidden section of said memory at the same time.

10. A method according to claim 6 wherein said video data comprises several separate movies, and said writing step stores only a subset of the blocks for a subset of those movies, and all of the blocks for the remaining movies, in said hidden section of said memory at the same time.

11. A method according to claim 1 wherein said sending step is repeated by said video server application program, at a series of spaced-apart times with each such time being started by a notification from said network interface circuit.

12. A method according to claim 11 wherein, in response to each notification, said video server application program sends a message to said network interface circuit which identifies a starting address for a block of said video data in said hidden section of said memory.

13. A method according to claim 1 wherein said network interface circuit issues said read commands to said hidden section of said memory, independent of said paging by said operating system program.

14. A method according to claim 1 wherein said disk is chosen from the group of a magnetic disk and an optical disk.

* * * * *